(12) United States Patent
Hong et al.

(10) Patent No.: US 11,013,044 B2
(45) Date of Patent: May 18, 2021

(54) PROXIMITY-BASED WIRELESS COMMUNICATION METHOD AND USER EQUIPMENT

(71) Applicant: LG Electronics Inc., Seoul (KR)

(72) Inventors: Jongwoo Hong, Seoul (KR); Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/477,802

(22) PCT Filed: Jan. 12, 2018

(86) PCT No.: PCT/KR2018/000623
§ 371 (c)(1),
(2) Date: Jul. 12, 2019

(87) PCT Pub. No.: WO2018/131935
PCT Pub. Date: Jul. 19, 2018

(65) Prior Publication Data
US 2019/0373652 A1 Dec. 5, 2019

Related U.S. Application Data

(60) Provisional application No. 62/445,733, filed on Jan. 13, 2017.

(51) Int. Cl.
*H04W 76/14* (2018.01)
*H04W 76/11* (2018.01)
(Continued)

(52) U.S. Cl.
CPC ............ *H04W 76/14* (2018.02); *H04W 76/11* (2018.02); *H04W 80/02* (2013.01); *H04W 88/04* (2013.01); *H04W 92/18* (2013.01)

(58) Field of Classification Search
CPC .................................................... H04W 76/14
See application file for complete search history.

(56) References Cited

U.S. PATENT DOCUMENTS

2016/0192427 A1* 6/2016 Yun ..................... H04W 76/14
370/329
2016/0302249 A1 10/2016 Sheng
(Continued)

FOREIGN PATENT DOCUMENTS

| WO | WO2016159712 | 10/2016 |
|---|---|---|
| WO | WO2016182597 | 11/2016 |
| WO | WO2016186387 | 11/2016 |

OTHER PUBLICATIONS

Zte, "Discussion on layer 2 ProSe UE-to-network relay for feD2D," R2-168147, 3GPP TSG-RAN WG2 Meeting #96, Reno, USA, Nov. 14-18, 2016, 4 pages.

*Primary Examiner* — Sithu Ko
*Assistant Examiner* — Won Tae C Kim
(74) *Attorney, Agent, or Firm* — Fish & Richardson P.C.

(57) ABSTRACT

A user equipment (UE) (first UE) receives setting information about a plurality of transmission (Tx) resource pools and a plurality of reception (Rx) resource pools for a cell. On the basis of the setting information, and the identity (ID) of the first UE (first UE ID) or the ID of another UE (second UE) (second UE ID) connected for proximity-based wireless communication with the first UE, the first UE determines a portion (Tx resource group) of the plurality of Tx resource pools and a portion (Rx resource group) of the plurality of Rx resource pools. The first UE performs sidelink transmission to the second UE by using a Tx resource pool which belongs to the Tx resource group. The first UE performs sidelink reception from the second UE by using an Rx resource pool which belongs to the plurality of Rx resource groups.

15 Claims, 10 Drawing Sheets

(51) Int. Cl.
*H04W 80/02* (2009.01)
*H04W 88/04* (2009.01)
*H04W 92/18* (2009.01)

(56) References Cited

U.S. PATENT DOCUMENTS

2018/0054804 A1* 2/2018 Luo ........................ H04W 72/04
2018/0152920 A1* 5/2018 Zhao ...................... H04W 40/22

* cited by examiner (a) Control-Plane Protocol Stack (b) User-Plane Protocol Stack

PROXIMITY-BASED WIRELESS COMMUNICATION METHOD AND USER EQUIPMENT

CROSS-REFERENCE TO RELATED APPLICATIONS

This application is a National Stage application under 35 U.S.C. § 371 of International Application No. PCT/KR2018/000623, filed on Jan. 12, 2018, which claims the benefit of U.S. Provisional Application No. 62/445,733, filed on Jan. 13, 2017. The disclosures of the prior applications are incorporated by reference in their entirety.

TECHNICAL FIELD

The present invention relates to a wireless communication system, Particularly, the present invention relates to a method of performing a proximity-based wireless communication and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, when one UE performs access through another UE functioning as a relay, a new method for efficient communication between the two UEs is needed.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of performing proximity-based wireless communication by a user equipment (UE) (a first UE) with another UE (a second UE) connected to the first UE for proximity-based wireless communication. The method includes receiving configuration information regarding a plurality of transmission (Tx) resource pools and a plurality of reception (Rx) resource pools for a cell; determining a part (a Tx resource group) among the plural Tx resource pools and a part (an Rx resource group) among the plural Rx resource pools, based on the configuration information, an identity (ID)) of the first UE (a first UE ID), or an ID of the second UE (a second UE ID); and performing sidelink transmission to the second UE using a Tx resource pool belonging to the Tx resource group or performing sidelink reception from the second UE using an Rx resource pool belonging to a plurality of Rx resource groups.

According to another aspect of the present invention, provided herein is a user equipment (UE) (a first UE) for performing proximity-based wireless communication with another UE (a second UE) connected to the first UE for proximity-based wireless communication. The first UE includes a radio frequency (RF) unit, a processor configured to control the RF unit. The processor may be configured to control the RF unit to receive configuration information regarding a plurality of transmission (Tx) resource pools and a plurality of reception (Rx) resource pools for a cell. The processor may be configured to determine a part (a Tx resource group) among the plural Tx resource pools and a part (an Rx resource group) among the plural Rx resource pools, based on the configuration information, an identity (ID)) of the first UE (a first UE ID), or an ID of the second UE (a second UE ID). The processor may be configured to control the RF unit to perform sidelink transmission to the second UE using a Tx resource pool belonging to the Tx resource group or control the RF unit to perform sidelink reception from the second UE using an Rx resource pool belonging to a plurality of Rx resource groups.

In each aspect of the present invention, the Tx resource group may be determined based on the second UE ID.

In each aspect of the present invention, the Rx resource group may be determined based on the first UE ID.

In each aspect of the present invention, the first UE ID may be a source layer-2 ID of the first UE and the second UE ID may be a source layer-2 ID of the second UE.

In each aspect of the present invention, the configuration information may be received through system information of a cell to which the plural Tx resource pools and the plural Rx resource pools belong.

In each aspect of the present invention, when the first UE is a remote UE and the second UE is a relay UE, the configuration information may be received from the second UE.

In each aspect of the present invention, when the first UE is a relay UE and the second UE is a remote UE, the first UE may receive the configuration information from a base station (BS) and transmit the configuration information to the second UE.

In each aspect of the present invention, when the first UE is a relay UE and the second UE is a remote UE, the first UE may transmit data received from the second UE to a base station (BS) connected to the first UE. When the first UE is a relay UE and the second UE is a remote UE, the first UE may transmit the data of the second UE received from the BS to the second UE using a Tx pool belonging to the Tx resource group.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to an embodiment of the present invention, delay/latency occurring during communication between a UE and a BS may be reduced.

Also, it is possible to efficiently transmit/receive a small amount of data for smart devices, or efficiently transmit/receive data occurring at a low frequency.

In addition, when one UE performs access through another UE functioning as a relay, communication between the two UEs can be efficiently performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
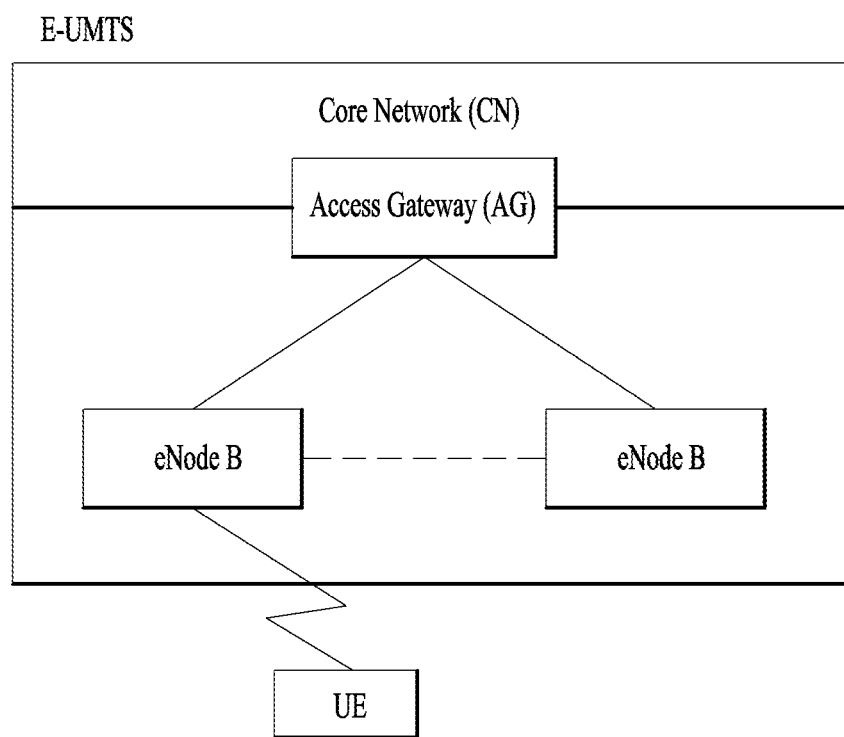
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TR 36.746, 3GPP TS 36.321, 3GPP TS 36.322, 3GPP TS 36.323 and 3GPP TS 36.331 may be referenced.

Figure 2:
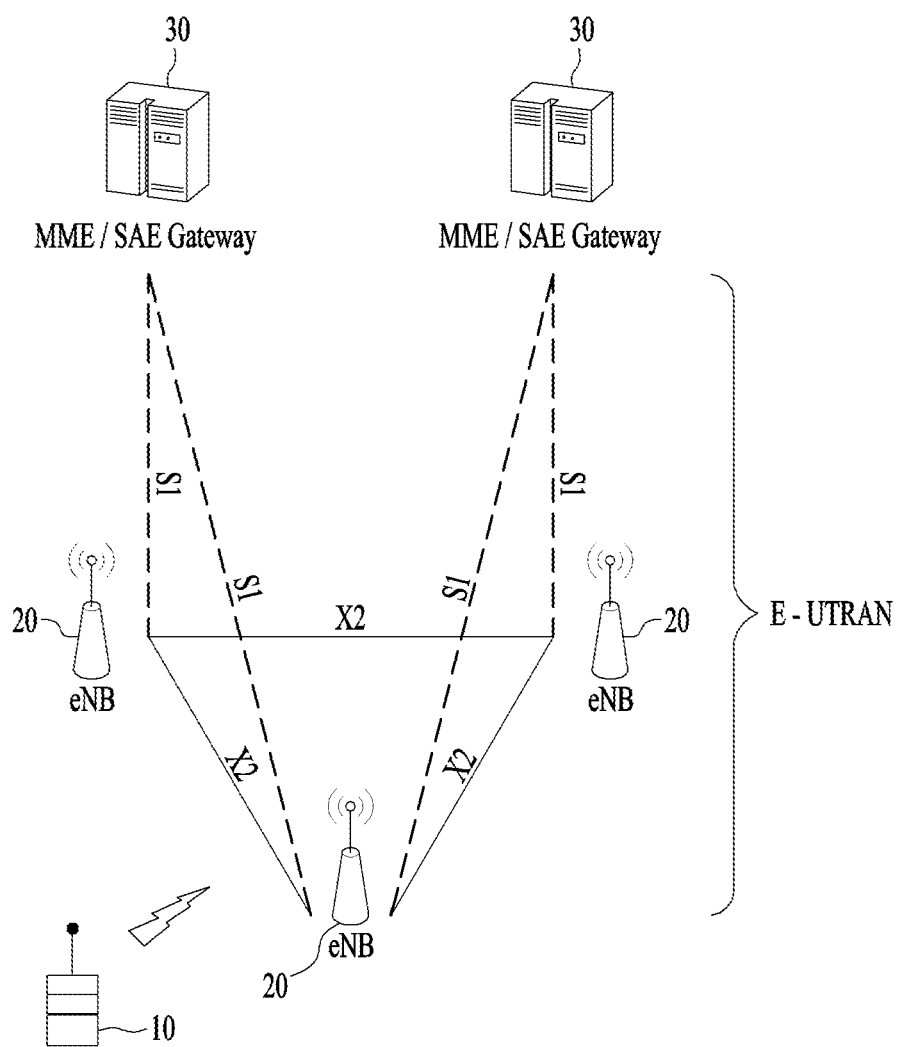
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
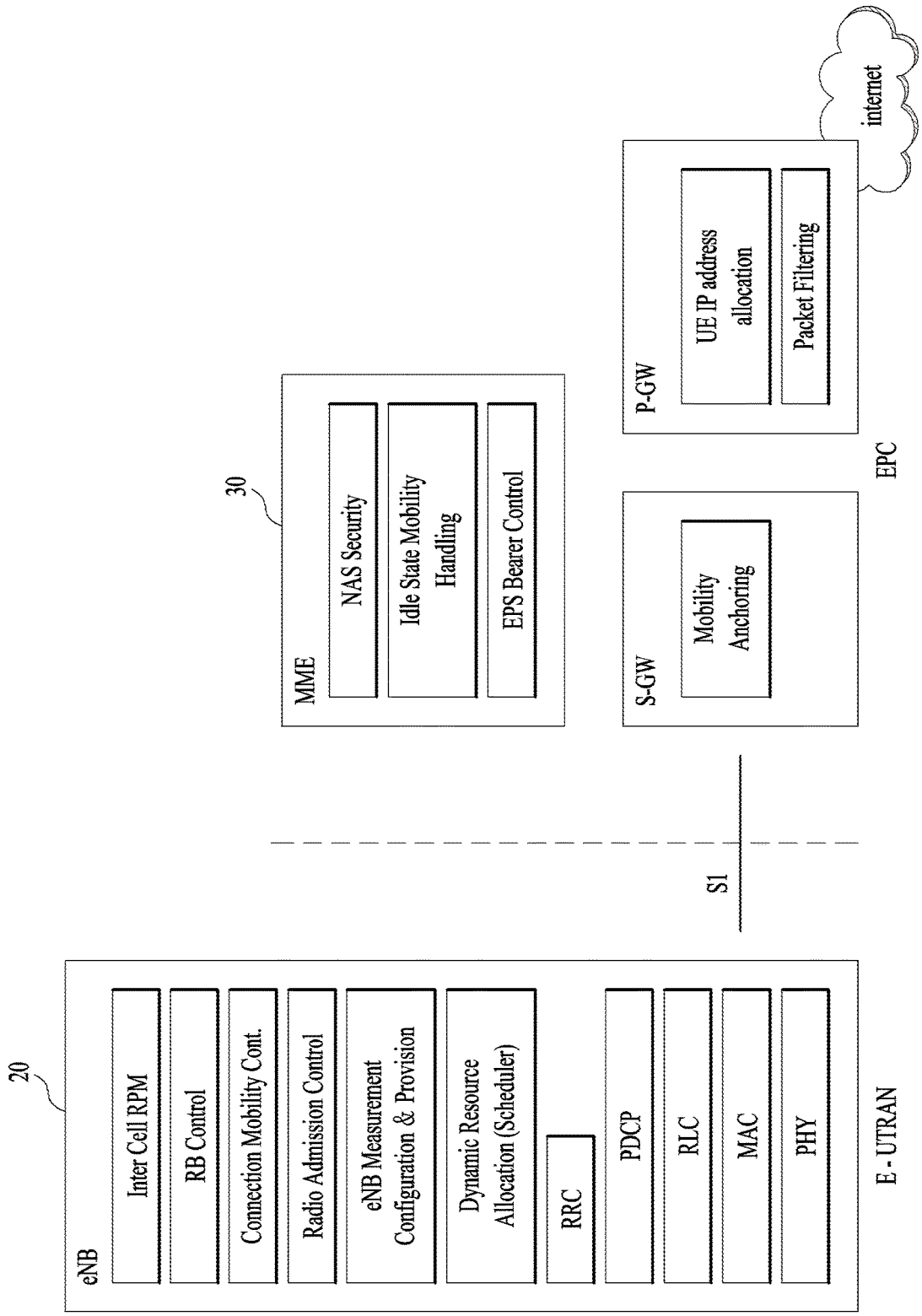
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
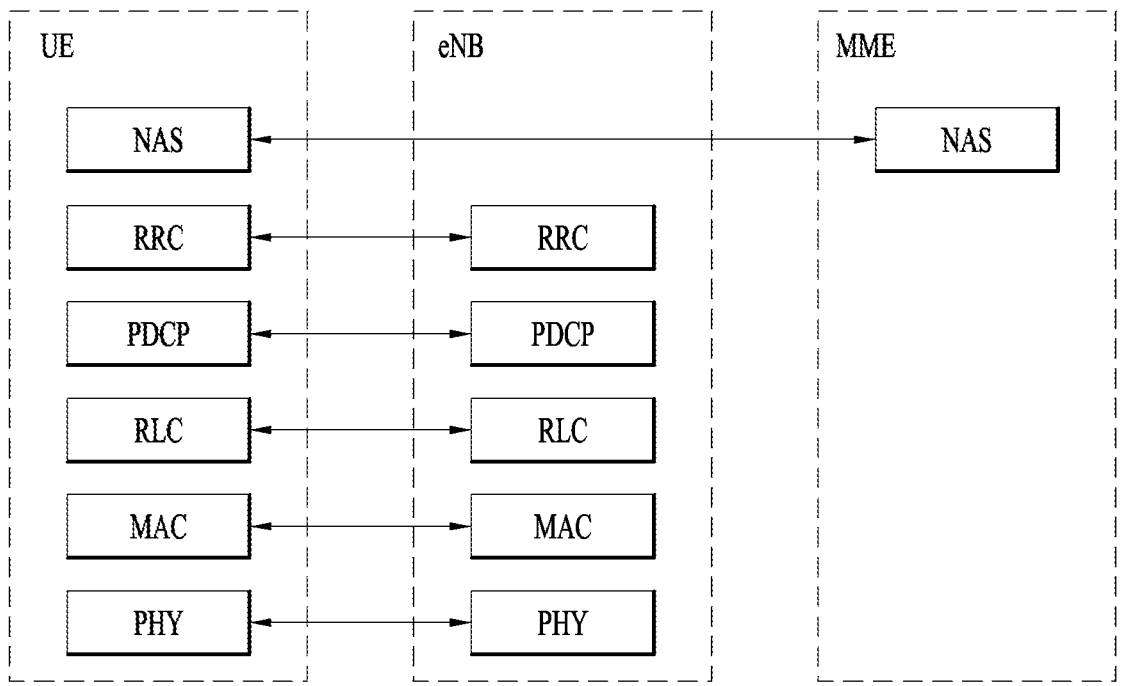
FIG. 4 is a diagram showing a control plane and a user plane of a radio interface protocol between a UE and an E-UTRAN based on a 3GPP radio access network standard.
Figure 4:
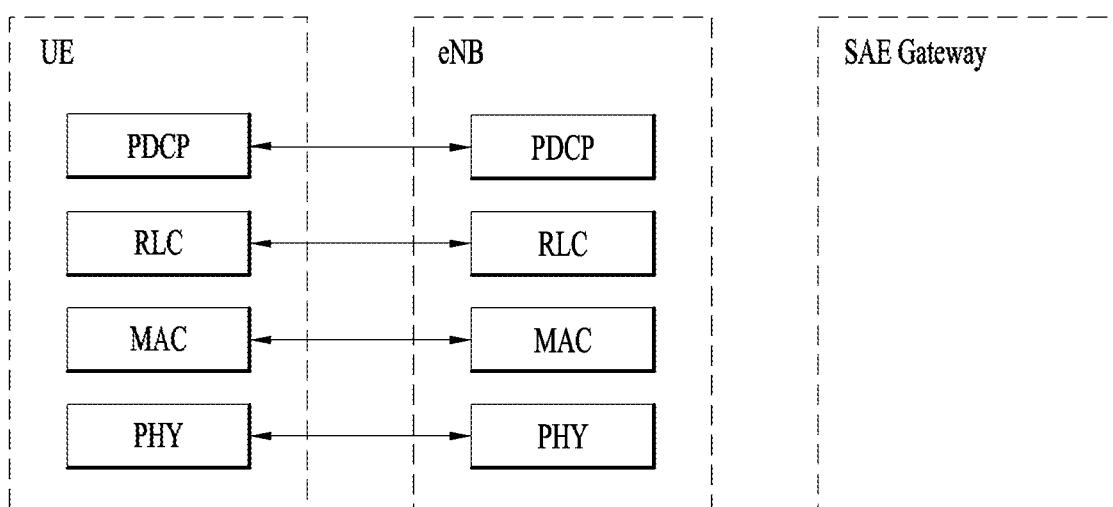

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer (i.e. L1 layer) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer (i.e. L2 layer) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
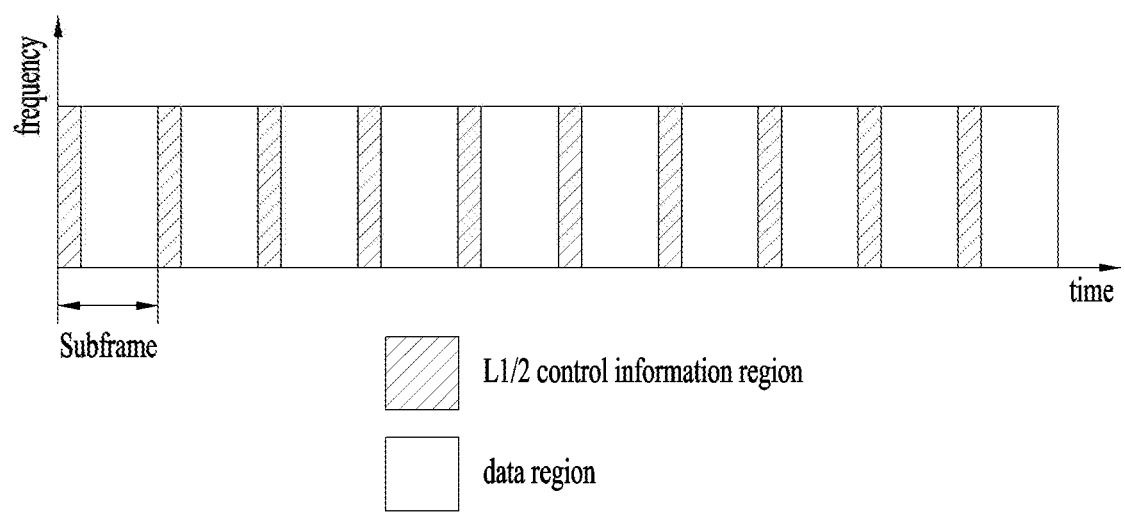
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Proximity service (ProSe) communication has been introduced into a wireless communication network for minimization of power consumption of UEs, communication support for UEs located out of network coverage, and emergency communication, based on 3GPP. ProSe refers to a service that allows physically close devices to discover themselves and communicate via direct links, via an eNB, or via a third device. In this case, user plane data is exchanged between UEs through a direct data path without passing through a 3GPP core network (e.g., EPC). In a legacy wireless communication system, two UEs generally communicate with each other via the eNB and the core network (e.g., EPC) that are operated by an operator. In contrast, ProSe communication supports direct communication between two UEs without passing through the eNB and the core network (e.g., EPC) that are operated by an operator. Recently, Prose communication has considered introduction of relay, for improvement in network coverage to raise performance and connection to non-3GPP communication (e.g., Wi-Fi, Bluetooth, etc.). Herein, ProSe communication may include ProSe UE-to-network relay.

Figure 6:
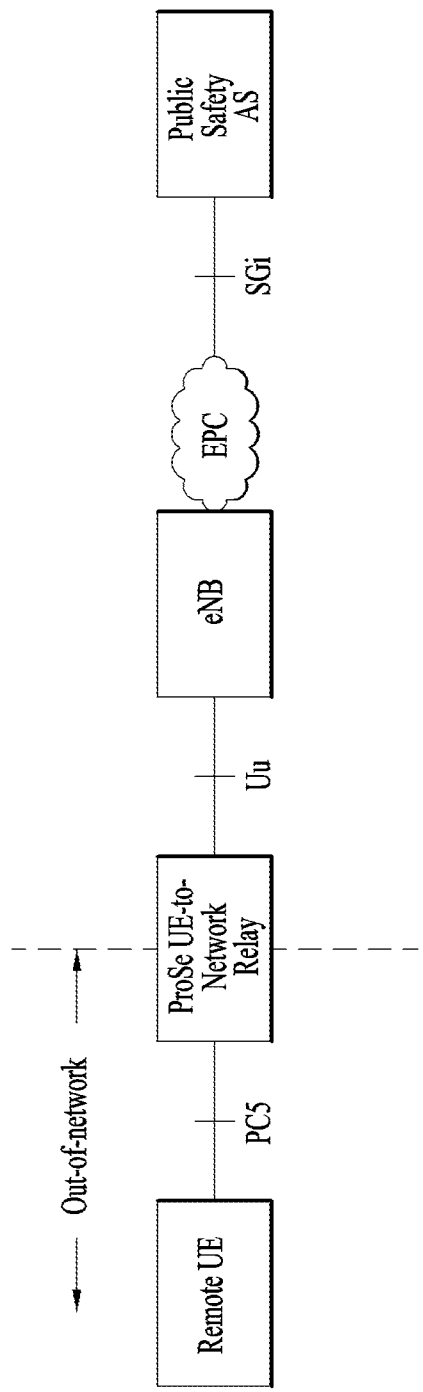
FIG. 6 illustrates communication via ProSe UE-to-network relay.

FIG. 6 illustrates communication via ProSe UE-to-network relay.

A UE-to-network relay UE provides connectivity to an EPC for a remote UE so that the remote UE may communicate with an application server (AS) or participate in group communication. Then, a UE located out of network coverage (e.g., a UE that is not served by an E-UTRAN) may receive a connectivity service to a network through the ProSe UE-to-network relay UE. In addition, even a UE located within network coverage may perform communication with only power of a degree capable of reaching a near relay rather than an eNB distant from the UE, using ProSe UE-to-network relay, thereby saving battery. A UE that is operable as the ProSe UE-to-network relay UE may access a network to provide relay traffic to the remote UE. In the present invention, the remote UE refers to a UE that is not served by wireless communication networks (e.g., an E-UTRAN, NextGen, etc.) and is connected to the network via UE-to-network relay. The ProSe UE-to-network relay UE (hereinafter, a relay UE) refers to a UE that transfers, between a network using wireless communication technologies (e.g., E-UTRAN, new RAT (i.e., NR), etc.) and the remote UE, information/data that should be transmitted/received between the remote UE and the network. In a radio interface, ProSe communication is implemented through sidelink communication. In the present invention, ProSe communication may be implemented using an LTE-based PC5 interface. The PC5 interface is a reference point between ProSe-enabled UEs used for control and user planes for ProSe direct discovery, ProSe direct communication, and ProSe UE-to-network relay (see 3GPP TS 23.303). Lower protocol layers of the PC5 reference point may be based on E-UTRA sidelink capabilities or WLAN technology, specified in 3GPP TS 36.300. The PC5 interface may be used between the remote UE and the relay UE and a Uu interface, which is also used for normal UE-to-network communication, may be used between the relay UE and a network node (e.g., eNB). If discovery and discovery announcement are made between UEs through PC5-S, which is a higher layer than a radio resource control (RRC) layer, the UEs are linked. PC5-S denotes a PC5 signaling protocol. The PC5-S protocol is used for control plane signaling over PC5 (e.g., establishment, maintenance, and release of a secure layer-2 link over PC5, temporary mobile group identity (TMGI) monitoring requests, cell ID announcement requests, etc.) (see 3GPP TS 23.303). If PC5 connection is established between the UEs so that the UEs are linked, radio resource configuration for sidelink communication between the UEs is performed based on RRC signaling. The UEs perform sidelink transmission/reception (e.g., transmission/reception of sidelink control information and related data) using resources in the radio resource configuration in a physical layer. A part of a sidelink communication procedure will now be described with reference to 3GPP TS 36.331.

A UE capable of performing sidelink communication may be configured by an upper layer (e.g., a ProSe layer) of an RRC layer so as to receive sidelink communication. In this case, the UE shall:

if the conditions for sidelink communication operation (see section 5.10.1a of 3GPP TS 36.331) are met:

if in coverage on the frequency used for sidelink communication (see 3GPP TS 36.304):

if the cell chosen for sidelink communication reception broadcasts SystemInformationBlockType18 including commRxPool:

configure lower layers (e.g. MAC layer, PHY layer) of RRC layer to monitor sidelink control information and the corresponding data using the pool of resources indicated by commRxPool;

else (i.e. out of coverage on the sidelink carrier):

configure lower layers to monitor sidelink control information and the corresponding data using the pool of resources that were preconfigured (i.e. preconfigComm in SL-Preconfiguration defined in section 9.3 of 3GPP TS 36.331).

A UE capable of sidelink communication that is configured by upper layers to transmit non-relay related sidelink communication and has related data to be transmitted or a UE capable of relay related sidelink communication that is configured by upper layers of the RRC layer to transmit relay related sidelink communications and satisfies the conditions for relay related sidelink communication shall:

if the conditions for sidelink communication operation (see section 5.10.1a of 3GPP TS 36.331) are met:

if in coverage on the frequency used for sidelink communication (see 3GPP TS 36.304):

if the UE is in RRC CONNECTED and uses the Pcell for sidelink communication:

if the UE is configured, by the current Pcell/the Pcell in which physical layer problems or radio link failure was detected, with commTxResources set to scheduled:

if T310 or T311 is running; and if the PCell at which the UE detected physical layer problems or radio link failure broadcasts SystemInformationBlockType18 including commTxPoolExceptional; or if T301 is running and the cell on which the UE initiated connection re-establishment broadcasts SystemInformationBlockType18 including commTxPoolExceptional:

configure lower layers to transmit the sidelink control information and the corresponding data using the pool of resources indicated by the first entry in commTx-PoolExceptional;
else:
configure lower layers to request E-UTRAN to assign transmission resources for sidelink communication.
else if the UE is configured with commTxPool-NormalDedicated or commTxPoolNormalDedicatedExt:
if priorityList is included for the entries of commTxPool-NormalDedicated or commTxPoolNormalDedicatedExt:
configure lower layers to transmit the sidelink control information and the corresponding data using the one or more pools of resources indicated by commTxPool-NormalDedicated or commTxPoolNormalDedicatedExt i.e. indicate all entries of this field to lower layers;
else:
configure lower layers to transmit the sidelink control information and the corresponding data using the pool of resources indicated by the first entry in commTx-PoolNormalDedicated;
else (i.e. sidelink communication in RRC IDLE or on cell other than Pcell in RRC CONNECTED):
if the cell chosen for sidelink communication transmission broadcasts SystemInformationBlockType1:
if SystemInformationBlockType18 includes commTx-PoolNormalCommon:
if priorityList is included for the entries of commTxPool-NormalCommon or commTxPoolNormalCommonExt:
configure lower layers to transmit the sidelink control information and the corresponding data using the one or more pools of resources indicated by commTxPool-NormalCommon and/or commTxPoolNormalCommonExt i.e. indicate all entries of these fields to lower layers;
else:
configure lower layers to transmit the sidelink control information and the corresponding data using the pool of resources indicated by the first entry in commTx-PoolNormalCommon;
else if SystemInformationBlockType18 includes commTxPoolExceptional:
from the moment the UE initiates connection establishment until receiving an RRCConnectionReconfiguration including sl-CommConfig or until receiving an RRCConnectionRelease or an RRCConnectionReject;
configure lower layers to transmit the sidelink control information and the corresponding data using the pool of resources indicated by the first entry in commTx-PoolExceptional;
else (i.e. out of coverage on sidelink carrier):
if priorityList is included for the entries of preconfig-Comm in SL-Preconfiguration:
configure lower layers to transmit the sidelink control information and the corresponding data using the one or more pools of resources indicated preconfigComm i.e. indicate all entries of this field to lower layers and in accordance with the timing of the selected SyncRef UE, or if the UE does not have a selected SyncRef UE, based on the UEs own timing;
else:
configure lower layers to transmit the sidelink control information and the corresponding data using the pool of resources that were preconfigured i.e. indicated by the first entry in preconfigComm in SL-Preconfiguration and in accordance with the timing of the selected SyncRef UE, or if the UE does not have a selected SyncRef UE, based on the UEs own timing.

The conditions for relay related sidelink communication are as follows:
if the transmission concerns sidelink relay communication; and the UE is capable of sidelink relay or sidelink remote operation:
if the UE is in RRC IDLE; and if the UE has a selected sidelink relay UE: configure lower layers of the RRC layer to transmit the sidelink control information and the corresponding data using the resources only if the following condition is met:
if the sidelink remote UE threshold conditions (see section 5.10.11.5 of 3GPP TS 36.331) are met; and if the UE configured lower layers with a pool of resources included in SystemInformationBlockType18 (i.e. commTxPoolNormalCommon, commTxPoolNormalCommonExt or commTxPoolExceptional); and commTx-AllowRelayCommon is included in SystemInformationBlockType18;
if the UE is in RRC CONNECTED: configure lower layers of the RRC layer to transmit the sidelink control information and the corresponding data using the resources, only if the following condition is met:
if the UE configured lower layers with resources provided by dedicated signalling (i.e. commTxResources); and the UE is configured with commTxAllowRelayDedicated set to true.

Information element (IE) SystemInformationBlockType18 may indicate that an E-UTRAN supports a sidelink UE information procedure and include sidelink communication related resource configuration information. IE sl-CommConfig specifies dedicated configuration information for sidelink communication. Particularly, IE sl-CommConfig relates to transmission resource configuration for sidelink communication on a primary frequency. For a description of IEs associated with other sidelink configurations, reference may be made to 3GPP 36.331.

Technology for a sidelink relay operation includes UE-to-network relaying via 3GPP or non-3GPP access (e.g., using Wi-Fi/Bluetooth). Sidelink refers to a link between a remote UE and a relay UE. The remote UE may be connected to the network through the relay UE. It is expected that, for example, wearable, machine type communication (MTC), or Internet of things (IoT) devices will mainly be used as the remote UEs. In this case, there is a high possibility that these devices lie in an environment in which battery capacity is not sufficient or battery consumption should be minimized. Therefore, a method of supporting UEs participating in sidelink communication so as to perform energy-efficient communication is needed.

Figure 7:
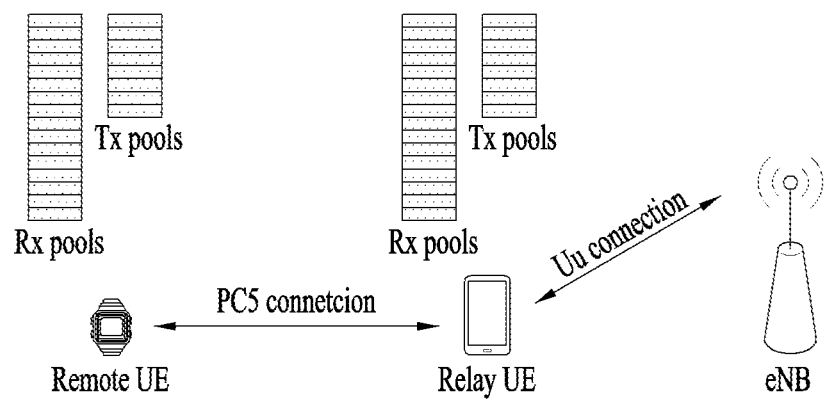
FIG. 7 illustrates a sidelink communication resource according to existing communication standards.

FIG. 7 illustrates a sidelink communication resource according to existing communication standards.

In existing communication standards, sidelink communication is based on operation of wideband UEs or MTC UEs. When a relaying operation is performed between a remote UE and a relay UE, 16 common reception (Rx) pools and 8 common transmission (Tx) pools are configured by RRC for sidelink communication. The common Tx pools are configured as a subset of the common Rx pools. If the remote UE and the relay UE are MTC UEs, each Rx or Tx pool occupies 6 physical resource blocks (PRBs) in the frequency domain. According to existing communication standards, sidelink reception is performed within entire configured common Rx pools. That is, in a legacy communication system, the remote UE should monitor all Rx pools in order to receive data relayed by the relay UE while the remote UE is being connected to the relay UE. According to existing communication standards, the relay UE should monitor all Tx pools having a possibility of being used by remote UEs for reception while the remote UE performs transmission within entire Tx pools. For example, a UE performing sidelink transmission (hereinafter, a Tx UE) performs transmission using 6 PRBs corresponding to one of the common Tx pools and a peer UE (hereinafter, an Rx UE) should monitor each of the common Rx pools because the Rx UE cannot be aware of a pool in which the Tx UE will transmit data among the common Rx pools. As an example, a Tx UE, which is participating in sidelink communication, transmits a physical sidelink control channel (PSCCH) on a time-frequency resource corresponding to an arbitrary Tx pool among the common Tx pools and an Rx UE attempts to receive the PSCCH and a physical sidelink shared channel that carries corresponding data on a time-frequency resource of each of the common Rx pools (see Section 9 of 3GPP TS 36.211 and Section 14 of 3GPP TS 36.213). Therefore, this method in which UEs may use an arbitrary pool in the common Tx and Rx pools for sidelink transmission and reception may be advantageous in that scheduling overhead of the network is reduced and even UEs in an RRC IDLE state may perform sidelink communication, whereas the method is disadvantageous in that energy consumption of remote UE(s) and a relay UE, that are linked while a sidelink operation is performed, increases. Considering that one of reasons why the sidelink operation is introduced is battery consumption, sidelink communication according to the above method may be undesirable. When narrowband (NB)-IoT using one PRB for communication as well as MTC using 6 PRBs for communication is applied to sidelink communication, not all pools can be used by an NB-IoT UE due to limited bandwidth. Since even a wideband UE that can use all pools should monitor sidelink control information and corresponding data in units of one PRB to receive the information and data from the NB-IoT UE, power consumption increases. The present invention proposes a method for solving such problems.

Figure 8:
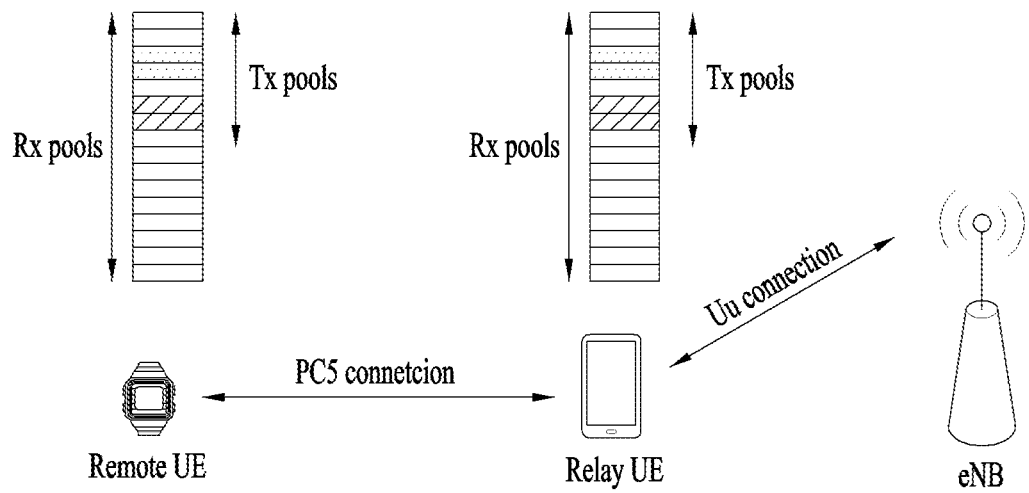
FIG. 8 illustrates a sidelink communication resource according to the present invention.

FIG. 8 illustrates a sidelink communication resource according to the present invention.

To reduce energy consumption of remote UEs and relay UEs, the present invention proposes, when a remote UE configured with resource pools, that the remote UE be configured with only a part of common Tx/Rx pool(s) and the partial common Tx/Rx pool(s) be used for sidelink transmission and reception. The remote UEs use differently configured Tx/Rx pool(s) and the different Tx/Rx pool(s) for the remote UEs may be configured for the relay UE. For example, referring to FIG. 8, the remote UE may be configured to attempt to perform sidelink reception using only two Rx pools among all common Rx pools and the relay UE may be configured to perform sidelink transmission within only two Tx pools among all common Tx pools. The two Rx pools available by the remote UE may be configured to be equal to or include the two Tx pools available by the relay UE. The remote UE may be configured to perform sidelink transmission within two Tx pools among all common Tx pools and the relay UE may be configured to attempt to perform sidelink reception only within two Rx pools among all common Rx pools. The two Tx pools available by the remote UE may be configured to be equal to or to be included in the two Rx pools available by the relay UE.

The configured Tx/Rx resource pools may be adjusted according to the number of remote UE connections or the amount of relayed traffic. According to the present invention, since a UE participating in sidelink communication monitors only a part of common Rx resource pools or related Rx resource pools, reception energy consumption in UE(s) participating in sidelink communication will be reduced. According to the present invention, since the UE participating in sidelink communication uses only a part of Tx pools, reception energy of a peer UE will be reduced due to reduced monitoring Rx pools.

Figure 9:
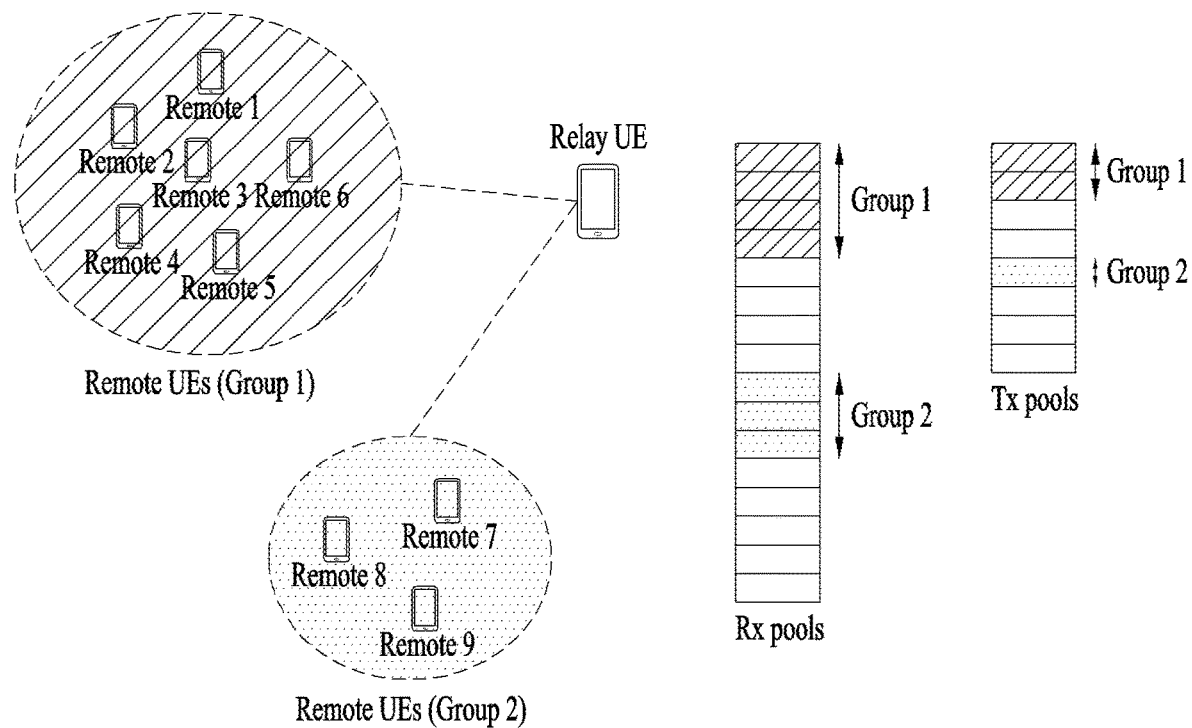
FIG. 9 illustrates a partial resource configuration according to the present invention.

FIG. 9 illustrates a partial resource configuration according to the present invention. Particularly, FIG. 9 illustrates the present invention described with reference to FIG. 8 in consideration of a plurality of remote UEs.

A UE group may be configured to use a part of common Tx/Rx resource pools for sidelink transmission/reception. Each UE group may include one remote UE or a plurality of remote UEs. Similarly, a group of corresponding Tx/Rx resource pools may include one Tx/Rx resource pool or a plurality of Tx/Rx resource pools. Referring to FIG. 9, remote UE(s) belonging to group 1 may monitor only Rx pools for group 1 among entire Rx pools (e.g., common Rx pools) to perform sidelink reception from a relay UE and remote UE(s) belonging to group 2 may monitor only Rx pools for group 2 among the all Rx pools to perform sidelink reception from the relay UE. The remote UE(s) belonging to group 1 may perform sidelink transmission within Tx pools for group 1 among all Tx pools (e.g., common Tx pools) and the remote UE(s) belonging to group 2 may perform sidelink transmission to the relay UE within Rx pools for group 2 among the all Tx pools.

Method 1 or Method 2 described below may be used to configure or select partial Tx/Rx pools according to the present invention.

\* Method 1)

A remote UE itself may select a part of resource pools using a modulo operation. A source ID and/or a destination ID (e.g., layer-2 ID), for example, may be used to configure or select a Tx pool and an Rx pool, for sidelink communication. A corresponding UE may be aware of a UE ID used as the source ID or the destination ID through a discovery message in a procedure of discovering a relay. Considering that configuration of Tx/Rx pools for sidelink is an operation of an RRC layer belonging to layer-2, layer-2 IDs may be used as the source ID and the destination ID. Herein, the layer-2 ID refers to an ID used to identify a source or a destination in a MAC, RLC, or PDCP and is different from a C-RNTI used in layer-1, i.e., a physical layer. A source layer-2 ID and a destination layer-2 ID may be included in, for example, a header of a MAC protocol data unit (PDU), an RLC PDU, or a PDCP PDU. In the following examples, while the present invention will be described based on the layer-2 ID, a layer-1 ID may be used instead of the layer-2 ID in the present invention.

A UE may select an Rx pool using a UE ID thereof, i.e., a source ID thereof, and select a Tx pool using a peer ID, i.e., a destination ID. Referring to FIG. 8, an Rx pool to be used when a remote UE, a source ID of which is AA, receives a signal from a relay UE, a source ID of which is BB, may be associated with AA, which is the source ID of the remote UE (i.e., a destination ID from the viewpoint of the relay UE) and a Tx pool to be used when the remote UE transmits a signal to the relay UE may be associated with BB, which is a destination ID of the relay UE (i.e., a source ID of the relay UE from the viewpoint of the relay UE).

According to the present invention, even though an eNB does not UE-specifically signal radio resources for sidelink, the radio resources may be randomly used so that an interference degree caused by sidelink communication may decreases on a carrier. Furthermore, the number of resource pools that the UE should monitor is reduced so that battery consumption of the UE may be reduced. In addition, since a part of common Tx/Rx pools is selected based on a source ID and/or a destination ID, even a UE in an RRC IDLE or RRC INACTIVE state may perform sidelink communication as in existing communication standards in which all common Tx/Rx pools have been used.

For example, a part of resource pools may be selected through the following procedures.

S1. A remote UE discovers a relay UE in the proximity thereof. Next, a PC5-S connection is established between the remote UE and the relay UE.

S2. The remote UE receives a Tx/Rx resource pool configuration from an eNB (or the relay UE) through system information or dedicated signaling. Tx/Rx resource pools in the Tx/Rx resource pool configuration may be partitioned into groups. The groups are numbered as group indexes (e.g., up to a maximum number of Tx or Rx pools starting from 1). Each group includes one or plural pools. That is, common Tx resource pools for sidelink communication on a cell may be divided into a plurality of Tx sub resource pools and common Rx resource pools for sidelink communication on a cell may be divided into a plurality of Rx sub resource pools. The Tx/Rx resource pools in the Tx/Rx resource pool configuration may be partitioned by a fixed rule and may be sequentially numbered as group indexes. In this case, the fixed rule may not be separately signaled to the UE by the eNB. Alternatively, the Tx/Rx resource pools in the Tx/Rx resource pool configuration may be partitioned according to configuration by the eNB and the eNB may signal information about Tx/Rx resource pool groups (i.e., Tx/Rx sub resource pools).

S3. The remote UE selects Tx/Rx pool(s) for a sidelink operation.

To select a part of the Rx pools, the remote UE may perform a modulo operation based on a source or destination layer-2 ID.

Based on a derived modulo value, the remote UE may select a group of Rx pool(s) having a group ID or a group index matching the derived modulo value. For example, an Rx resource group having the same group index as 'source Layer-2 ID' mod 'the number of groups' may be selected as the group of Rx pool(s) for the remote UE. Herein, 'the number of groups' may be the number of Rx groups constituting entire (common) Rx pools. Referring to FIG. 8, when a layer-2 ID of the remote UE is AA and a layer-2 ID of the relay UE is BB, since the remote UE selects an Rx group that the remote UE should monitor, the remote UE may select the Rx group based on AA, which is the source ID thereof. Since a Tx UE should perform sidelink transmission within resource pools that an Rx UE monitors, if the Rx UE determines the Rx pools using the source ID thereof, it is better for the Tx UE to select Tx pools using the source ID of the Rx UE, i.e., the destination ID from the viewpoint of the Tx UE. Accordingly, the relay UE may select Tx pool(s) for the remote UE through a modulo operation based on the destination layer-2 ID. Based on the derived modulo value, the relay UE may select a group of Tx pool(s) having a group ID or a group index matching the derived modulo value. For example, a Tx resource group having the same group index as 'destination ProSe ID' mod 'the number of groups' may be selected as the group of Tx pool(s) for the remote UE. Herein, 'the number of groups' may be the number of Tx groups constituting all (common) Tx pools.

Referring to FIG. 8, when a layer-2 ID of the remote UE is AA and a layer-2 ID of the relay UE is BB, since the relay UE should select a Tx group including the same pools or a part of the same pools as pools belonging to an Rx group that the remote UE is to monitor, the relay UE may select the Tx group based on AA.

To select a part of Tx pools, the remote UE may perform a modulo operation based on a source or destination layer-2 ID.

Based on the derived modulo value, the remote UE may select a group of Tx pool(s) having a group ID or a group index matching the derived modulo value. For example, a Tx resource group having the same group index as 'destination Layer-2 ID' mod 'the number of groups' may be selected as the group of Tx pool(s). Herein, 'the number of groups' may be the number of Tx groups constituting all common Tx pools. Referring to FIG. 8, if the layer-2 ID of the remote UE is AA and the layer-2 ID of the relay UE is BB, the remote UE may select a Tx group based on BB. The relay UE may select Rx pool(s) for the remote UE through a modulo operation based on a ProSe UE ID of the UE. Based on the derived modulo value, the relay UE may select a group of Rx pool(s) having a group ID or a group index matching the derived modulo value. For example, an Rx resource group having the same group index of 'ProSe ID of remote UE' mod 'the number of groups' may be selected as the group of Rx pool(s) for the remote UE. Herein, 'the number of groups' may be the number of Rx groups constituting all (common) Rx pools. Referring to FIG. 8, when the layer-2 ID of the remote UE is AA and the layer-2 ID of the relay UE is BB, the relay UE may select an Rx group based on BB.

S4. If data transmission/reception through sidelink is triggered, the remote UE performs transmission/reception using only the selected sidelink Tx/Rx pools.

Method 1 may also be applied even when the relay UE selects the Tx/Rx pool.

Except for information about the number of Tx resource groups or the number of Rx resource groups, the eNB may transmit, in Method 1, a configuration of common Tx/Rx pools through system information or dedicated signaling according to existing standards. If the number of Tx resource groups and the number of Rx resource groups are fixed or predefined in a system, only the UE may be configured to be aware of the numbers. Since the eNB does not need to perform a separate signaling operation, the eNB may perform a legacy operation.

* Method 2)

Each Tx pool may be configured with target information. The target information may be an ID of an Rx UE (e.g., a ProSe UE ID). Upon transmitting data to a target UE, the Tx UE selects Tx pool(s) associated with an ID of the target UE. The Tx UE may be a relay UE or a remote UE. The Rx UE is configured with Rx pool(s) of a restricted set, associated with Tx pool(s) of the Tx UE for the Rx UE. According to this method, the Rx UE may monitor Rx resources of a restricted set so that power of the Rx UE may be saved. For example, Method may be applied as follows.

S1. The remote UE discovers the relay UE in the proximity thereof. Next, a PC5-S connection is established between the remote UE and the relay UE.

S2. The remote UE receives a Tx/Rx resource pool configuration from the eNB through dedicated signaling.

S3. The relay UE is configured with Tx/Rx resource pools. Each Tx resource pool is configured with an ID of the remote UE.

S4. When transmitting data to the remote UE, the relay UE selects a Tx pool satisfying that an ID associated with the Tx pool matches an ID of the remote UE. Next, the relay UE transmits data to the remote UE using the selected Tx pool.

S5. The remote UE receives the data through sidelink using the configured Rx pool(s).

As another example, Method 2 may be applied as follows.

S1. The remote UE discovers the relay UE in the proximity thereof. Next, a PC5-S connection is established between the remote UE and the relay UE.

S2. The relay UE receives the Tx/Rx resource pool configuration from the eNB through dedicated signaling.

S3. The remote UE is configured with the Tx/Rx resource pools. Each Tx resource pool is configured with an ID of the relay UE.

S4. Upon transmitting data to the relay UE, the remote UE selects a Tx pool satisfying that and ID associated with the Tx pool matches an ID of the relay UE. Next, the remote UE transmits data to the relay UE using the selected Tx pool.

S5. The relay UE receives the data through sidelink using the configured Rx pool(s).

Figure 10:
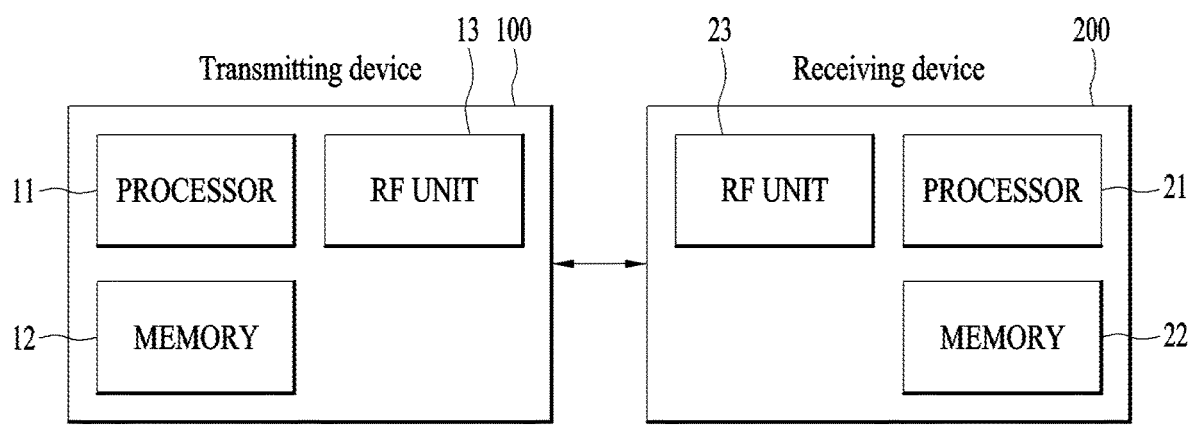
FIG. 10 is a block diagram illustrating elements of a transmitting device 100 and a receiving device 200 for implementing the present invention.

FIG. 10 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

If a PC5 connection is established between two UEs (hereinafter, a first UE and a second UE), sidelink communication may be performed using a radio resource. Each UE processor may be configured to determine a part among common Tx pools or a part among common Rx pools, based on an ID of the first UE (hereinafter, a first UE ID) and/or an ID of the second UE (hereinafter, a second UE ID), as radio resource pools to be used between a corresponding UE (hereinafter, the first UE) and a peer UE (hereinafter, the second UE) according to the present invention. Specifically, a processor of the first UE (hereinafter, a UE processor) may control an RF unit of the first UE (hereinafter, a UE RF unit) to receive configuration information regarding a plurality of transmission (Tx) resource pools for sidelink communication and a plurality of reception (Rx) resource pools for sidelink communication among radio resources on a cell (e.g., a carrier) to be used for sidelink. The UE processor may determine a part (a Tx resource group) among the plural Tx resource pools and a part (an Rx resource group) among the plural Rx resource pools, based on the configuration information, the first UE ID, or the second UE ID. The UE processor may control the UE RF unit to perform sidelink transmission to the second UE using a Tx resource pool belonging to the Tx resource group. The UE processor may control the UE RF unit to perform sidelink reception from the second UE using an Rx resource pool belonging to the plural Rx resource groups.

The UE processor may determine the Tx resource group based on the second UE ID and determine the Rx resource group based on the first UE ID. The first UE ID may be a source layer-2 ID of the first UE and the second UE ID may be a source layer-2 ID of the second UE. System information of a cell to which the plural Tx resource pools and the plural Rx resource pools belong may include the configuration information.

When the first UE is a remote UE and the second UE is a relay UE, the UE processor may control the UE RF unit to receive the configuration information from the second UE. When the first UE is the relay UE and the second UE is the remote UE. the UE processor may control the UE RF unit to transmit data received from the second UE to a BS connected to the first UE. When the first UE is the relay UE and the second UE is the remote UE, the UE processor may control the UE RF unit to transmit data received from the second UE to the BS connected to the first UE. When the first UE is the relay UE and the second UE is the remote UE, the UE processor may control the UE RF unit to transmit data of the second UE received from the BS to the second UE using a Tx pool belonging to the Tx resource group.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method of performing proximity-based wireless communication by a user equipment (UE) (a first UE) with another UE (a second UE) connected to the first UE for proximity-based wireless communication, the method comprising:
  receiving configuration information regarding a plurality of transmission (Tx) resource pools and a plurality of reception (Rx) resource pools for a cell, wherein the plurality of Tx resource pools are partitioned into groups (Tx resource groups) and sequentially numbered as group indexes, and wherein the plurality of Rx resource pools are partitioned into groups (Rx resource groups) and sequentially numbered as group indexes;
  determining (i) a first Tx resource group among the Tx resource groups and (ii) a first Rx resource group among the Rx resource groups, based on at least one of a source layer-2 identifier (ID) of the first UE or a destination layer-2 ID of the first UE, wherein the source layer-2 ID of the first UE corresponds to a destination layer-2 ID of the second UE and wherein the destination layer-2 ID of the first UE corresponds to a source layer-2 ID of the second UE; and
  performing sidelink transmission to the second UE using a Tx resource pool belonging to the first Tx resource group or performing sidelink reception from the second UE using an Rx resource pool belonging to the first Rx resource group,
  wherein determining (i) the first Tx resource group among the Tx resource groups and (ii) the first Rx resource group among the Rx resource groups comprises:
    deriving a first modulo value by performing a modulo operation based on the destination layer-2 ID of the first UE;
    determining the first Tx resource group by selecting a Tx resource group having a group index that matches with the first modulo value;
    deriving a second modulo value by performing a modulo operation based on the source layer-2 ID of the first UE; and
    determining the first Rx resource group by selecting an Rx resource group having a group index that matches with the second modulo value.

2. The method of claim 1, wherein the configuration information is received through system information of a cell to which the plurality of Tx resource pools and the plurality of Rx resource pools belong.

3. The method of claim 1, wherein, based on the first UE being a remote UE and the second UE being a relay UE, the configuration information is received from the second UE.

4. The method of claim 1, further comprising:
  transmitting the configuration information to the second UE, based on the first UE being a relay UE and the second UE being a remote UE.

5. The method of claim 1, further comprising:
  transmitting data received from the second UE to a base station (BS) connected to the first UE, and transmitting the data of the second UE received from the BS to the second UE using a Tx pool belonging to the first Tx resource group, based on the first UE being a relay UE and the second UE being a remote UE.

6. A user equipment (UE) (a first UE) configured to perform proximity-based wireless communication with another UE (a second UE) connected to the first UE for proximity-based wireless communication, the UE comprising,
  a radio frequency (RF) unit,
  a processor configured to control the RF unit,
  wherein the processor is configured to
  control the RF unit to receive configuration information regarding a plurality of transmission (Tx) resource pools and a plurality of reception (Rx) resource pools for a cell, wherein the plurality of Tx resource pools are partitioned into groups (Tx resource groups) and sequentially numbered as group indexes, and wherein the plurality of Rx resource pools are partitioned into groups (Rx resource groups) and sequentially numbered as group indexes;

determine (i) a first Tx resource group among the Tx resource groups and (ii) a first Rx resource group among the Rx resource groups, based on at least one of a source layer-2 identifier (ID) of the first UE or a destination layer-2 ID of the first UE, wherein the source layer-2 ID of the first UE corresponds to a destination layer-2 ID of the second UE and wherein the destination layer-2 ID of the first UE corresponds to a source layer-2 ID of the second UE; and control the RF unit to perform sidelink transmission to the second UE using a Tx resource pool belonging to the first Tx resource group or control the RF unit to perform sidelink reception from the second UE using an Rx resource pool belonging to the first Rx resource group, wherein the processor is configured to determine (i) the first Tx resource group among the Tx resource groups and (ii) the first Rx resource group among the Rx resource groups by:

deriving a first modulo value by performing a modulo operation based on the destination layer-2 ID of the first UE;

determining the first Tx resource group by selecting a Tx resource group having a group index that matches with the first modulo value;

deriving a second modulo value by performing a modulo operation based on the source layer-2 ID of the first UE; and determining the first Rx resource group by selecting an Rx resource group having a group index that matches with the second modulo value.

7. The UE of claim 6,
wherein the configuration information is received through system information of a cell to which the plurality of Tx resource pools and the plurality of Rx resource pools belong.

8. The UE of claim 6,
wherein, based on the first UE being a remote UE and the second UE being a relay UE, the configuration information is received from the second UE.

9. The UE of claim 6,
wherein the processor is configured to control the RF unit to transmit the configuration information to the second UE, based on the first UE being a relay UE and the second UE being a remote UE.

10. The UE of claim 6,
wherein the processor is configured to control the RF unit to transmit data received from the second UE to a base station (BS) connected to the first UE and controls the RF unit to transmit the data of the second UE received from the BS to the second UE using a Tx pool belonging to the first Tx resource group, based on the first UE being a relay UE and the second UE being a remote UE.

11. The method of claim 1,
wherein the UE derives the first modulo value by equation A below,
<equation A>
$X = Y \bmod Z$,
wherein X denotes the first modulo value, Y denotes the destination layer-2 ID of the first UE, and Z denotes a number of the Tx resource groups.

12. The method of claim 1,
wherein the UE derives the second modulo value by equation A below,
<equation A>
$X = Y \bmod Z$,
wherein X denotes the second modulo value, Y denotes the source layer-2 ID of the first UE, and Z denotes a number of the Rx resource groups.

13. The UE of claim 6,
wherein the UE derives the first modulo value by equation A below,
<equation A>
$X = Y \bmod Z$,
wherein X denotes the first modulo value, Y denotes the destination layer-2 ID of the first UE, and Z denotes a number of the Tx resource groups.

14. The UE of claim 6,
wherein the UE derives the second modulo value by equation A below,
<equation A>
$X = Y \bmod Z$,
wherein X denotes the second modulo value, Y denotes the source layer-2 ID of the first UE, and Z denotes a number of the Rx resource groups.

15. A processing device configured to control a user equipment (UE) (a first UE) to perform proximity-based wireless communication with another UE (a second UE) connected to the first UE for proximity-based wireless communication, the processing device comprising, a processor; and a computer memory operably connected to the processor and storing instructions that, based on being executed by the processor, perform operations comprising:

receiving configuration information regarding a plurality of transmission (Tx) resource pools and a plurality of reception (Rx) resource pools for a cell, wherein the plurality of Tx resource pools are partitioned into groups (Tx resource groups) and sequentially numbered as group indexes, and wherein the plurality of Rx resource pools are partitioned into groups (Rx resource groups) and sequentially numbered as group indexes;

determining (i) a first Tx resource group among the Tx resource groups and (ii) a first Rx resource group among the Rx resource groups, based on at least one of a source layer-2 identifier (ID) of the first UE or a destination layer-2 ID of the first UE, wherein the source layer-2 ID of the first UE corresponds to a destination layer-2 ID of the second UE and wherein the destination layer-2 ID of the first UE corresponds to a source layer-2 ID of the second UE; and performing sidelink transmission to the second UE using a Tx resource pool belonging to the first Tx resource group or performing sidelink reception from the second UE using an Rx resource pool belonging to the first Rx resource group, wherein determining (i) the first Tx resource group among the Tx resource groups and (ii) the first Rx resource group among the Rx resource groups comprises:

deriving a first modulo value by performing a modulo operation based on the destination layer-2 ID of the first UE;

determining the first Tx resource group by selecting a Tx resource group having a group index that matches with the first modulo value;

deriving a second modulo value by performing a modulo operation based on the source layer-2 ID of the first UE; and determining the first Rx resource group by selecting an Rx resource group having a group index that matches with the second modulo value.

\* \* \* \* \*